INVENTOR.
WATTS S. HUMPHREY JR.

BY
ATTORNEY

INVENTOR.
WATTS S. HUMPHREY JR.
BY
ATTORNEY

INVENTOR.
WATTS S. HUMPHREY JR.

United States Patent Office 3,168,697
Patented Feb. 2, 1965

3,168,697
METHOD AND APPARATUS FOR TESTING MARGINAL FAILURE OF ELECTRONIC SYSTEMS
Watts S. Humphrey, Jr., Chappaqua, N.Y., assignor to Sylvania Electric Products Inc., a corporation of Delaware
Filed Nov. 17, 1960, Ser. No. 70,060
6 Claims. (Cl. 324—73)

This invention is concerned with electronic testing equipment and methods and particularly with improvements in testing for marginal failure in components of complex electronic systems.

A major concern with large scale electronic equipments is machine reliability and testing. One preventive maintenance technique, which has been employed extensively with computers, is to use marginal testing to anticipate component failures. This is usually accomplished by varying, in positive or negative excursions, the voltages supplied to the component circuits of the computer and thereby detecting those components which are deteriorating. Such tests are frequently supplemented by diagnostic programming. If the machine fails under such a marginal condition, it may be concluded that one or more of its component packages is marginal. A problem arises, however, in locating the specific package or circuit which is in dangerous condition.

Accordingly, a primary object of the present invention is to provide an improved means of marginal testing for pending component failures in electronic assemblies. Other objects are to locate specific packages and circuits subject to failure during marginal operation and to perform these operations in an automated procedure.

These and related objects are accomplished in one illustrative embodiment of the invention by connecting each individual module to be tested to a diode isolated common terminal at a separate intersection of a matrix of x- and y-coordinate conductors. These conductors are in turn connected through separate switching systems to a regular and a marginal voltage source. By selectively dropping each conductor of the matrix to marginal level for a negative check, or raising it for a positive check, individual modules prone to failure under marginal conditions may be pin pointed. A significant merit of this arrangement is that by proper sequencing of the switching operation the voltage supplies to the circuit modules may be raised and lowered while the equipment is in continuous operation. This makes it unnecessary to go through equipment shutdown and warmup sequences and avoids the introduction into the system of spurious signals due to switching during marginal checking operations.

Other forms and modifications of the invention will be apparent from the following description and reference to the accompanying drawings, wherein.

Figure 1:
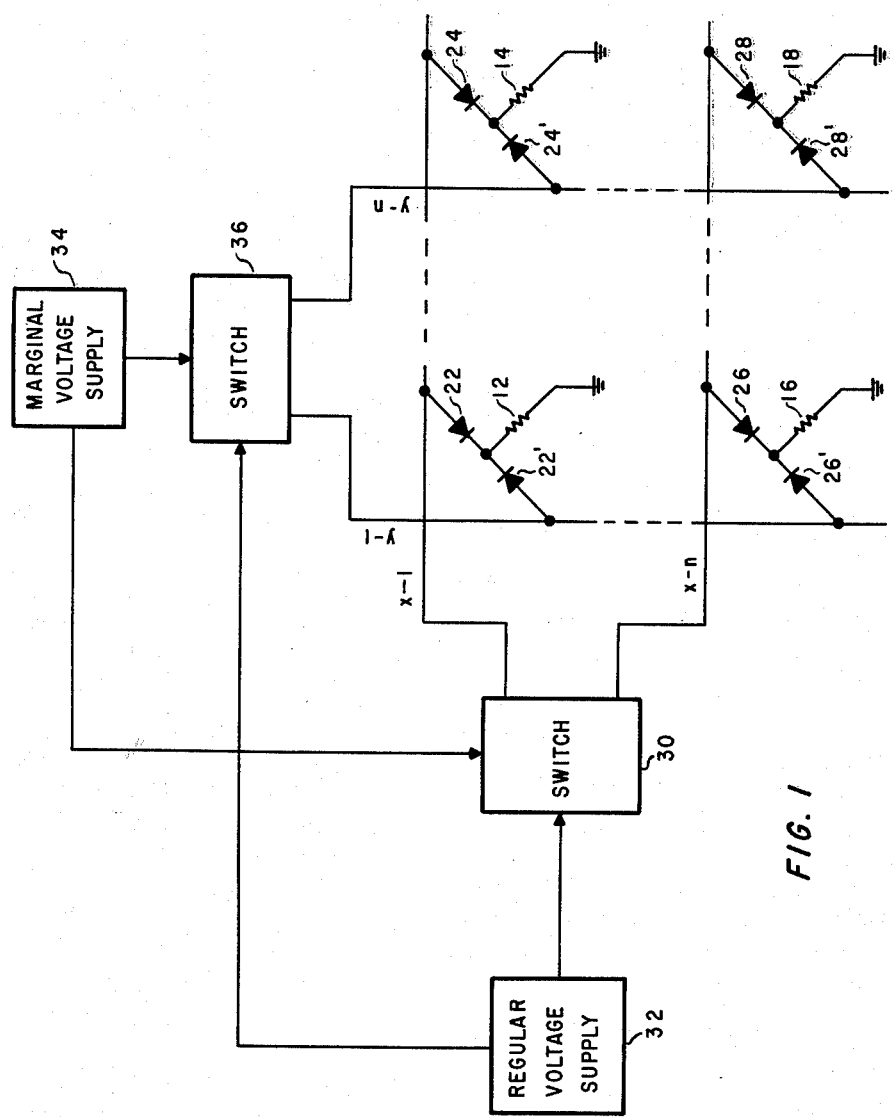
FIG. 1 is a schematic representation of a marginal testing matrix embodying the invention.

The basic arrangement of items to be tested in the embodiment of the invention which is to be described in detail is shown in FIG. 1. This arrangement is featured by packages or sub-assemblies, represented as resistive loads, 12, 14, 16, 18, connected to a marginal voltage supply through a matrix of conductors $x-1$, $x-n$, $y-1$, $y-n$. Each package 12–18 is connected to both an x- and a y-coordinate conductor through diodes 22, 22'; 24, 24'; 26, 26'; 28, 28'; respectively. As a result, the voltage which is applied to any package 12–18 is the higher of the voltages on its two coordinate conductors and sneak paths are prevented by the isolating diodes.

The x-coordinate conductors are connected, through a switch 30, to a "regular" voltage supply 32 and a "marginal" voltage supply 34, and the y-coordinate conductors are similarly connected, through a switch 36, to the regular and marginal supplies. The marginal supply 34 may include a voltage source higher than the regular supply to check for positive margins, a source lower than the regular supply to check for negative margins, or both higher and lower sources with appropriate switching to enable selective checking for both positive and negative margins.

In a typical installation we may assume, for illustrative purposes, that the items 12–18 represent modular circuit packages arranged in rows and columns within a bay or cabinet. For normal operation each package obtains its voltage supply from regular source 32 via both its x- and y-coordinate conductors. When marginal checking is to be performed, a marginal voltage is applied to one conductor of one of the coordinate groups, e.g., $x-1$, and then all of the conductors of the other group, e.g. $y-1$ through $y-n$, are simultaneously deenergized. This results in the modules of one row, viz. the one connected to $x-1$, being forced to operate under marginal voltage supply conditions. If a failure is noted by diagnostic programming or other suitable method, the fact that there is a marginal unit in line $x-1$ is noted and then the y-coordinate conductors are restored to normal operating energy level. A similar check on each one of the remaining x-coordinate conductors will indicate whether there are marginal units in any of the remaining rows.

If checking the rows indicates that some of the units are marginal, the procedure is repeated with the y-coordinate conductors being individually switched to marginal potential and the x conductors being collectively de-energized and re-energized to regular potential while each of said y conductors is at marginal potential. The required switching may be accomplished manually or automatically with appropriate toggle, stepping or electronic switches.

The particular switching sequence suggested is merely illustrative. It is apparent that other sequences can be employed. For example, negative margins can be checked by applying the marginal voltage to one group of co-ordinate conductors and regular potential to the other, and then individually de-energizing the others to find if it is servicing a marginal unit. Or, positive checking can be performed by applying regular voltage to one group of coordinates and individually raising each of the conductors of the other group to a positive margin. Also, the switching program can be altered so that its individual modules are checked as soon as any row or column indicates marginal performance. The greatest economy of switching time and equipment are realized, however, by arranging units to be checked in a square matrix, checking sequentially down its rows and columns, noting marginal groups during this process, and then pinpointing marginal units at the intersection of groups in the manner previously described.

A significant feature of the matrix arrangement of voltage supply and switching sequences employed by this invention is that at least one of the coordinate conductors of every module is energized at all times. This avoids switching delays and the introduction of spurious signals into the system, thereby increasing its reliability and effectiveness and providing an ideal vehicle for high speed automatic checking as a programmed subroutine during fractional second time availabilities of computers and similar electronic data processing equipments whose operating time and reliability are at high premium.

Figure 2:
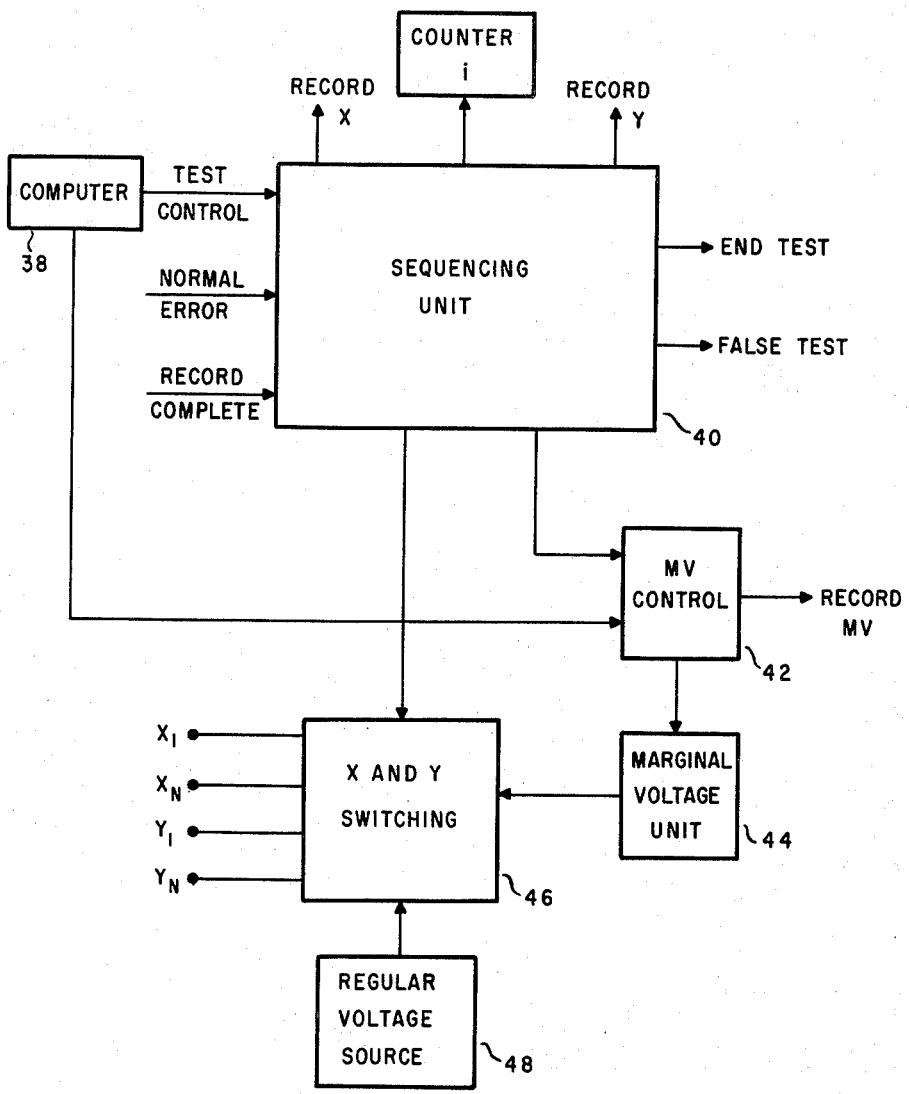
FIG. 2 is a block diagram of testing apparatus and a control system.

Application of the invention to an automated checking system is shown in FIG. 2.

In such a system either a computer 38, itself being tested, or some external device may provide a "Commence Test" signal on the basis of machine availability, time cycle, some sensed condition, etc. In response to this signal, stepping switches or other automatic programming devices may be used to cycle through a sequence of operations of the type previously described.

Many modifications of this arrangement are possible. For instance, the system may automatically sequence through the marginal testing process until an error is detected in the equipment under test. This error indication may then be used to halt the sequencing and restore regular operating voltage to the central equipment. This central equipment will then operate properly under normal conditions and may record the programmed step of the testing equipment when the error was detected to localize the specific package needing replacement.

A further extension of this testing process is to vary the marginal voltages in steps. The central computer 38 then detects and records the points of failure of a large number of packages and may be programmed to compute the probability that any of the packages should be replaced before the next testing interval. This probability may be based on the testing interval, the marginal voltages, and the past marginal history of the various packages.

In the particular marginal testing system shown in block diagram form in FIG. 2, a sequencing unit 40 is used to control the testing process. The central computer 38 signals to the test equipment, via the test control line (by means of a control flip-flop or other sensing device), that it is ready to test and the sequencing unit 40 then assumes control until it provides either the end of test or false test output.

An MV control unit 42 determines what marginal voltage is to be applied. It also may provide an output to the computer 38 which specifies the last marginal voltage applied by the test procedure. In this way, the computer has available the actual amplitude of marginal voltage on any line at the time the operating condition of modules connected to it is sensed.

The marginal voltage unit 44 is a variable power supply corresponding to the supply 34 of FIG. 1. It is controlled by the MV control 42 and supplies power to an $x$ and $y$ switching unit 46. A regular voltage source 48, corresponding to source 32 of FIG. 1, is also connected to the switching system 46. Voltage is applied to the appropriate $x$ and $y$ lines from source 44 or source 48 by switching unit 46 in accordance with control signals from the sequencing unit 40. A counter $i$ is provided to control the sequencing of unit 40.

Figure 3:
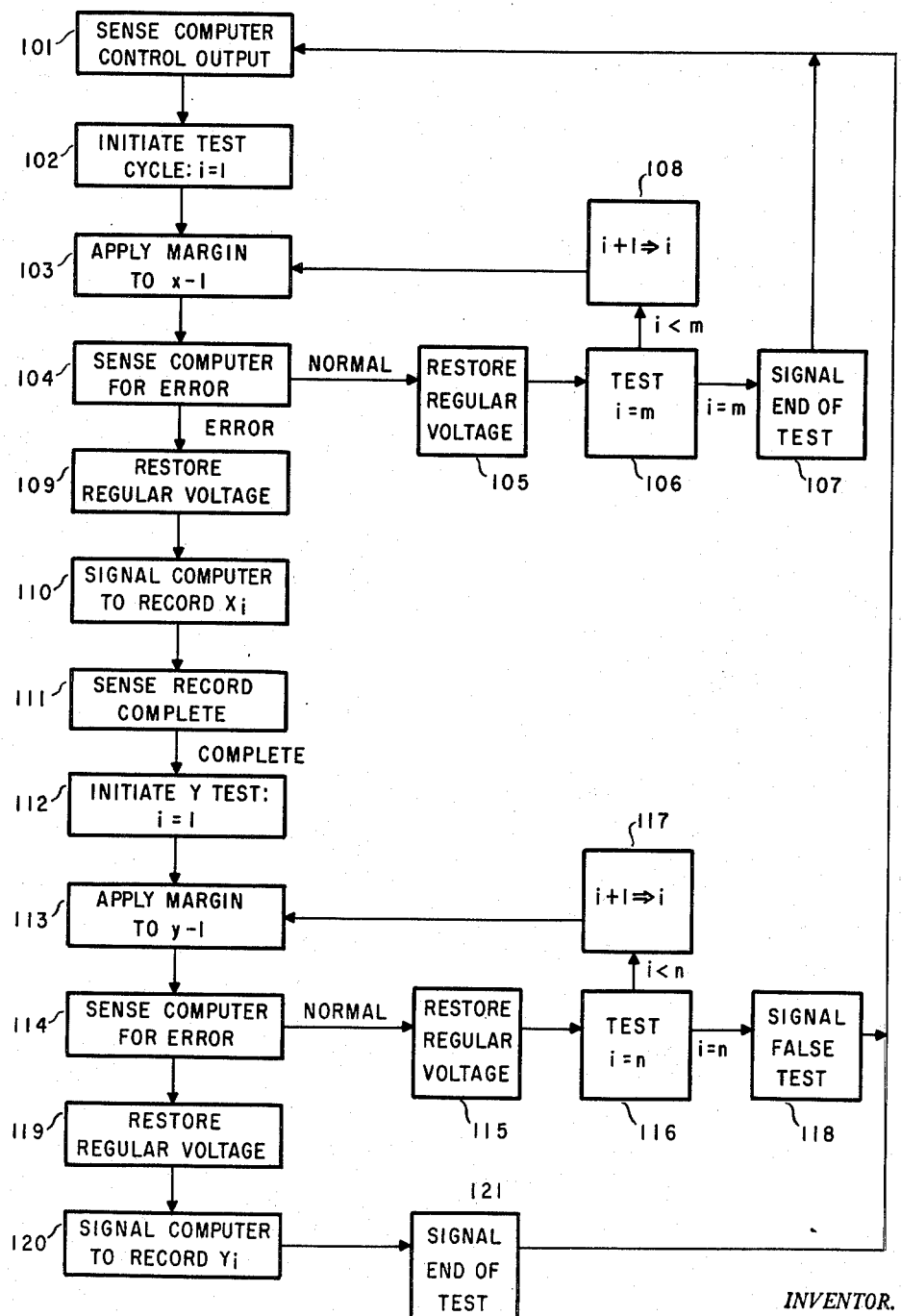
FIG. 3 is a diagrammatic representation of a sequence of testing operations in accordance with the invention.

A representative sequence of operations for this system is diagrammed in FIG. 3. In step 101 the computer 38 control output is sensed by the sequencing unit 40 and when this output indicates that the computer is ready for test, the sequencing unit takes control and initiates the test cycle as in step 102. This consists of setting the test cycle counter $i$ equal to 1, and sequencing through the steps of the marginal test procedure. In step 103 a marginal voltage is applied to line $x-1$ and the $y$ conductors are de-energized in accordance with the procedure described earlier. While this condition is maintained, the computer output is sensed, by some device such as a diagnostic program, in step 104 to detect whether or not it has failed while the row of modules supplied by conductor $x-1$ is operating under these marginal conditions.

If the computer response is normal, the operation goes to step 105 where the regular voltage is restored to line $x-1$ and step 106 where the sequencing counter $i$ is tested to determine if it has completed the cycle. If $i$ is equal to $m$, for instance, where $m$ is the total number of $x$ lines and there has been no marginal failure, the unit proceeds to step 107 and signals end of test. If $i$ is less than $m$, however, its count is increased by 1 in step 108 and the operation returns to step 103. This small sub-cycle could also include an incremental change in the marginal voltage. For instance, if it is desired to check $k$ steps in marginal voltage amplitude, $i$ may be increased only every $k$ times through this loop and the marginal voltage altered one increment every cycle until the $k$ checks are performed.

If an error output is sensed before $i$ equals $m$, the unit proceeds to step 109 and restores regular voltage to the $x$ conductor under test. In step 110 a signal is sent to the central computer calling for it to record $x_i$, i.e. the conductor which has experienced the marginal failure. The computer 38 may also sense the MV control 42 to indicate the last marginal voltage applied to the system as a means of acquiring additional data as to this particular failure. In step 111 the testing unit senses for a "record complete?" signal within the computer 38 and proceeds only when the computer indicates that it has recorded $x_i$ (and MV also when it is required as an input to the test program).

Steps 113 through 117 are a repeat of steps 102 through 108 except that they control the variation of the $y$ lines. Assuming that there are a total of $n$ $y$ lines, if $i$ achieves a count equal to $n$ during one cycle, it is apparent that there has been a marginal failure indicated on an $x$ line but not on a $y$ line. As a result, the sequencing unit 40 cycles back to step 101 and signals false test, via circuit 118, to the central computer 38. If a $y$ error is sensed, however, regular voltage is restored in step 119, the computer is signaled to record the $y_i$ and MV values in step 120, and end of test is signaled in step 121.

Several acknowledge outputs may be required from the computer. Those which have been already described indicate that the various values of $x_i$ and $y_i$ have been recorded. A similar acknowledge signal may also be employed at the end of test or false test steps. This allows the computer time to remove the test control signal and return to normal computation before another testing cycle is started.

This invention has been described with reference to one illustrative embodiment. Its scope, however, is not limited to the specific system shown and described, but embraces the following claims.

What is claimed is:

1. A method of testing electronic equipment for marginal performance of its component units which includes the steps of: connecting all of the units to be tested to a source of regular operating potential; while said units are so connected, connecting an $x$-coordinate group of said units to a source of marginal operating potential of a magnitude differing from said regular operating potential; then, disconnecting the units of said group from regular operating potential; checking the performance of said equipment while said group is so operating with marginal potential and recording unsatisfactory performance; similarly connecting, disconnecting, checking and recording for other $x$-coordinate groups of said units; similarly connecting, disconnecting, checking and recording for individual $y$-coordinate groups of said units; and, noting units at the intersection of $x$- and $y$-coordinate groups for which unsatisfactory performance has been recorded.

2. For the marginal testing of electronic equipment including a plurality of like units, a plurality of $x$-coordinate conductors connecting said units in $x$-coordinate groups, a plurality of $y$-coordinate conductors intersecting said $x$-coordinate conductors and connecting said units in $y$-coordinate groups, first switch means having a pair of input terminals and a plurality of output terminals each connected to a respective one of said $x$-coordinate conductors, second switch means having a pair of input terminals and a plurality of output terminals each connected to a respective one of said $y$-coordinate conductors, a source of normal operating potential connected to one of the input terminals of each of said first and second switch means, and a source of marginal testing potential differing in magnitude from said normal operating potential connected to the other input terminal of each of said first and second switching means, said switching means being operative to selectively connect said normal operating potential and said marginal testing potential to said $x$- and $y$-coordinate conductors.

3. Apparatus in accordance with claim 2 wherein each of said units is connected to its respective $x$- and $y$-coordinate conductor through unidirectional conducting devices poled to conduct current only in the direction from said conductors toward said unit.

4. Apparatus in accordance with claim 3 further including programmed sequencing means connected to said first and second switching means for controlling the operation thereof.

5. Apparatus in accordance with claim 4 wherein said electronic equipment comprises a computer consisting in part of said plurality of like units, said computer being connected to said sequencing means and operative to control the program thereof.

6. A method of testing electronic equipment including a plurality of like units for marginal performance of any unit which includes the steps of: connecting all of the units to be tested to a source of normal operating potential; while said units are so connected, connecting an $x$-coordinate group of said units to a source of marginal operating potential of a magnitude differing from said normal operating potential; then sequentially disconnecting the units of said $x$-coordinate group from the source of normal operating potential; checking the performance of said equipment while units of said $x$-coordinate group are so operated with marginal potential and recording unsatisfactory performance; similarly connecting, disconnecting, checking and recording a $y$-coordinate group of said units; and noting units at the intersection of $x$- and $y$-coordinate groups at which unsatisfactory performance has been recorded.

References Cited in the file of this patent

UNITED STATES PATENTS

| | | |
|---|---|---|
| 2,280,448 | Pfeiffer | Apr. 21, 1942 |
| 2,328,750 | Smith et al. | Sept. 7, 1943 |
| 2,868,997 | Mitchell | Jan. 13, 1959 |
| 2,934,704 | Gootherts | Apr. 26, 1960 |
| 2,996,666 | Baker | Aug. 15, 1961 |